[72] Inventors Edmond J. Thomas
Matawan, N.J.;
John E. Unrue, Jr., Westmont, Ill.

[21] Appl. No. 886,447
[22] Filed Dec. 19, 1969
[45] Patented Jan. 4, 1972
[73] Assignee Bell Telephone Laboratories, Incorporated
Murray Hill, N.J.

[54] METHOD FOR IMPROVING THE SETTLING TIME OF A TRANSVERSAL FILTER ADAPTIVE ECHO CANCELLER
7 Claims, 1 Drawing Fig.

[52] U.S. Cl. .......... 179/170.2
[51] Int. Cl. .......... H04b 3/22
[50] Field of Search .......... 179/170.2

[56] References Cited

UNITED STATES PATENTS

| | | | |
|---|---|---|---|
| 3,465,106 | 9/1969 | Nagata et al. | 179/170.2 |
| 3,499,999 | 3/1970 | Sondai | 179/170.2 |
| 3,500,000 | 3/1970 | Kelly et al. | 179/170.2 |
| 3,508,017 | 4/1970 | Unrue | 179/170.2 |

*Primary Examiner*—Kathleen Claffy
*Assistant Examiner*—William A. Helvestine
*Attorneys*—R. J. Guenther and E. W. Adams, Jr.

ABSTRACT: The method disclosed accomplishes a reduction in the initial "distance" between the tap gain vector, of a transversal filter adaptive echo canceller, and its optimum value. Tap gain magnitudes, related to the statistical distribution of echo path impulse response envelopes, are stored. The gains associated with each tap component are initially set to zero and adaptation then proceeds for a period of time sufficient to determine the polarity of each tap component. The determined polarities of each tap component are respectively assigned to the stored tap gain magnitudes and the tap components are set in accordance with the same. Convergence thence proceeds naturally from this new setting of the gain vector.

PATENTED JAN 4 1972 3,632,905
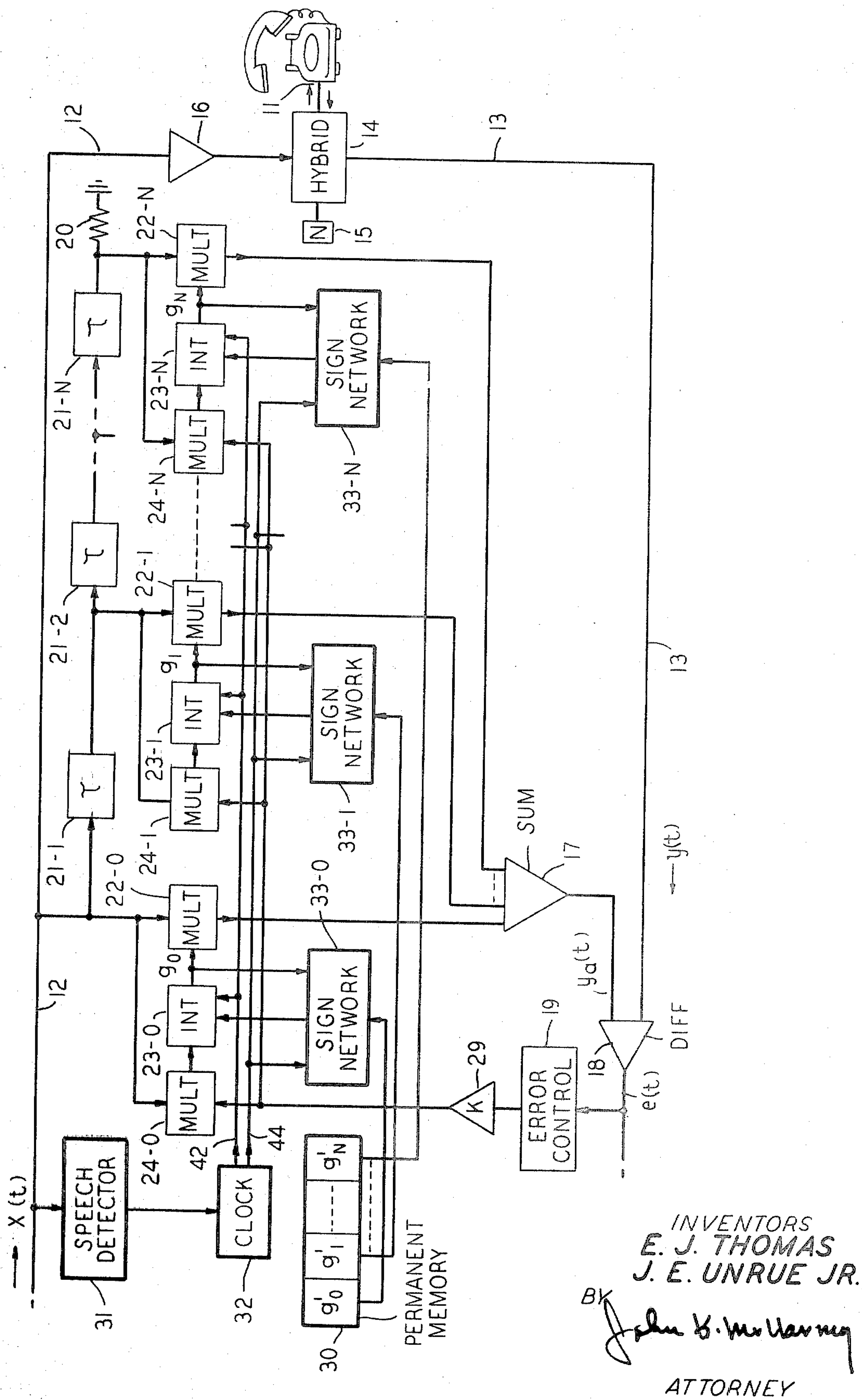
INVENTORS
E. J. THOMAS
J. E. UNRUE JR.
BY John B. McHarney
ATTORNEY

METHOD FOR IMPROVING THE SETTLING TIME OF A TRANSVERSAL FILTER ADAPTIVE ECHO CANCELLER

BACKGROUND OF THE INVENTION

This invention relates to the cancellation of echoes in communication circuits and more particularly to a method for improving the setting time of an adaptive echo canceller.

Echoes occur in telephone or communication circuits when electrical signals meet imperfectly matched impedance junctions and are partially reflected back to the talker. Because such signals require a finite travel time, this reflected energy, or echo, is heard some time after the speech is transmitted. As distances increase, the echo takes longer to reach the talker and becomes more and more annoying. An attempt is therefore generally made to control these reflections with voice-operated devices, known as echo suppressors. Conventional echo suppressors combat echo generated at hybrid junctions in long-distance communication circuits by interrupting the outgoing, or return, path according to some decision based upon the relative levels of the incoming and outgoing signals. Since an interruption of the return signal path also interrupts the outgoing signal circuit, the use of such suppressors, particularly in extremely long circuits, causes much talker confusion. In effect, such echo suppressors introduce chopping of the outgoing signal during periods of double-talking, i.e., during periods when the two speakers are talking simultaneously. It is apparent therefore that cancellation of echoes in the return signal path without an interruption of the path itself is desirable for satisfactory communications in circuits of extended length.

A novel solution to this problem is set forth in the article "An Adaptive Echo Canceller" by M. M. Sondhi, *The Bell System Technical Journal* of March 1967, Vol. 46, No. 3, pages 497–511. Briefly, a replica of the echo is developed by synthesizing an approximation to the echo transmission path. The replica signal is then subtracted from the return signal. Such a system, which is aptly described as an echo canceller to distinguish it from conventional echo suppressors, is characterized by a closed-loop error-control circuit. It is self-adapting in that it automatically tracks variations in the echo path which may arise during a conversation, for example, as additional circuits are connected or disconnected.

A problem associated with the use of a transversal filter adaptive echo canceller is the length of time required for adaptation. At the beginning of a conversation the echo canceller makes use of the first speech signals to adjust its simulation network to match that of the echo path. During this period of time, called "settling time," uncancelled echo is returned to the talker. It is desirable that the settling time be short in order to reduce adverse subjective reaction.

As will be more evident hereinafter, an adaptive echo canceller has a characteristic rate of adaptation which is determined by a particular parameter in the adaptation control network. The chosen rate provides a compromise between two annoying effects. A fast rate of adaptation results in the echo canceller being adversely influenced by noise or speech from the second party of the conversation during periods of double-talking. A slow rate results in long settling time.

The settling time not only depends on the rate of adaptation, but also on the "distance" between the initial and optimum states of the echo canceller. It should be intuitively clear that if this distance can be reduced a shorter settling time will result from the same rate of adaptation, and a better compromise between the two effects mentioned above can be achieved.

Accordingly, the object of the present invention is to improve, i.e., decrease, the settling time of an adaptive echo canceller without affecting the suppression achieved.

SUMMARY OF THE INVENTION

The above object is attained in accordance with the invention by a method which accomplishes a reduction in the initial distance between the tap gain vector, of an adaptive echo canceller, and the optimum value thereof. This, in turn, reduces the aforementioned settling time for a given characteristic rate of adaptation. To this end, tap gain magnitudes, related to a predetermined parameter (e.g., arithmetic mean or average) of the statistical distribution of echo path impulse response envelopes, are first stored. The proper polarity of each tap component of the tap gain vector is then found by initially setting all of the tap components to zero and allowing convergence to take place naturally for a predetermined short period of time. The polarities of each component determined during this period of natural convergence are then respectively assigned to the statistically determined stored magnitudes and the tap gain components are set in accordance with the same. Convergence is then permitted to proceed undisturbed (i.e., naturally) from this new setting of the gain vector.

BRIEF DESCRIPTION OF THE DRAWING

The single FIGURE is a detailed schematic block diagram of a transversal filter adaptive echo canceller, as modified in accordance with the principles of the present invention.

DETAILED DESCRIPTION

Referring now to the drawing, a single transmission terminal is shown for interconnecting a single two-way circuit 11 with two one-way circuits 12 and 13. Local circuit 11 typically is a conventional two-wire telephone circuit connecting a subscriber to circuits 12 and 13 by way of hybrid network 14. The impedance of local circuit 11 is matched insofar as possible by balancing network 15 associated with hybrid 14. Ideally, all incoming signals received from circuit 12 are delivered by way of isolating amplifier 16 and hybrid 14 to local circuit 11. None of this energy should be transferred to outgoing circuit 13. Similarly, all of the energy reaching hybrid 14 from local circuit 11 should be delivered to the outgoing circuit 13. Unfortunately, the balancing network 15 generally provides only a partial match to the two-wire circuit so that a portion of the incoming signal (from circuit 12) reaches the outgoing circuit 13. In the absence of adequate suppression or cancellation of this signal component, or echo, the signal accompanies outgoing signals which originated in circuit 11 and are delivered over the outgoing circuit 13 to a remote station or terminal. Upon reaching the distant station this signal, which originated there in the first place, is perceived as an echo. Accordingly, echo suppression or cancellation apparatus is typically employed to eliminate the return signal.

The other apparatus shown in block diagram form in the drawing comprises a transversal filter adaptive echo canceller for cancelling the return signal, or echo, without interrupting the outgoing circuit. In a manner analogous to that described in the aforementioned M. M. Sondhi article and also in the copending application of J. L. Kelly, Jr. and B. F. Logan, Ser. No. 591,382, filed Oct. 31, 1966, now U.S. Pat. No. 3,500,000, incoming signals in circuit 12 are passed through a synthesized network to produce, at the output of summing amplifier 17, a replica of the echo signal. The replica signal is algebraically subtracted from the signals outgoing in circuit 13 through the action of the difference network 18. Signals leaving network 18, therefore, are devoid of echo components. These signals are then transmitted to the remote station.

The transversal filter adaptive echo canceller shown in the drawing is the same as that of the aforementioned Sondhi article, but modified in accordance with the invention so as to improve (i.e., decrease) the settling time thereof. The additional equipment required to implement the method of the present invention is shown in heavy outline.

A brief description of the basic echo canceller at this point is appropriate. A more detailed, rigorous explanation of the same is set forth in the Sondhi article and the Kelly-Logan application. Accordingly, disregarding for the moment the additional apparatus required to implement the present invention, the incoming signals on circuit 12 are delivered to a transversal filter which includes a tapped delay line 21 having delay elements 21–1 through 21–N. Delay line 21 is suitably terminated by resistor 20. Each delay element of the delay line imparts a delay of $\tau$ seconds equal to the Nyquist interval of 1/2B where B is the bandwidth of circuit 12 in Hertz. In a typical example in practice, each element of the delay line imparts a 1/10-millisecond delay ($\tau$) to an applied signal. Thus, exact replicas of the signal in circuit 12 are repeatedly available at 1/10-millisecond intervals.

Individual signals produced at the taps of the delay line are adjusted in gain by means of multiplier networks 22–0 through 22–N through which they are directed, and are combined in the summing network 17. Multiplier networks 22 and multiplier networks 24 (to be discussed hereinafter) are so named because circuits known in the analog computer art as four-quadrant linear multipliers are used to implement these networks. Functionally, however, each of the multiplier networks 22 can be thought of as providing a changeable amount of gain (including both positive and negative gain and gain less then unity) between its respective output tap on delay line 21 and a corresponding input to summing network 17, the amount of gain presented by each of the multiplier networks 22 being directly proportional to the polarity and magnitude of a signal provided by its respective one of the integrator networks 23. Accordingly, multiplier networks 22 are also referred to hereinafter as gain control networks 22. The resultant composite signal from the output of summing network 17 is supplied to one input of difference network 18, the other input of which is supplied with signals outgoing via circuit 13. Difference network 18 effectively supplies the algebraic difference and delivers a reduced echo signal at its output.

The signals incoming on circuit 12 are speech signals characterized by erratic signal levels interspersed with silent intervals. Similarly, the signals in outgoing circuit 13 comprise a combination of locally generated signals, which vary considerably in magnitude and which are characterized by frequent silent intervals, together with delayed and attenuated replicas of the signal incoming on circuit 12, i.e., echo components. For this and other reasons, the characteristics of the transversal network must be automatically adjusted to assure that the signal developed by summing network 17 closely approximates only the echo component appearing in outgoing circuit 13.

In order to cope with changing conditions, a closed error loop technique is employed. Thus, an initial replica signal produced by summing network 17 is subtracted via difference network 18 from the composite output signal in circuit 13. The resultant signal thus represents the locally generated output signal plus any residue echo—i.e., that portion of the echo signal not removed through the subtraction process. This composite signal constitutes an error component which is processed by error signal control 19 and delivered, via an amplifier 29 having a positive feedback gain constant K, in parallel to multiplier networks 24–0 through 24–N. However, the error signal is not by itself suitable for indicating the necessary adjustment of the respective gain control networks 22 to obtain full correction. Accordingly, the incoming signals which appear in variously delayed versions at the junctions of delay elements 21 are mixed by multiplication with the error components in multiplier network 24–0 through 24–N, and the resultant signal is averaged in integrating networks 23 to produce a signal whose polarity and magnitude indicate the appropriate correction for each gain control network. Thus, if the error signal indicates a substantial remanent of the echo in the outgoing transmission line, the gain control networks 22 are individually adjusted to pass a greater portion of the incoming signal on circuit 12. Hence, the composite signal developed by network 17 and removed from the outgoing signal in network 18 tends to remove the disparity and reduce the magnitude of the error signal.

Following the adjustment outlined above, it may well be that an overshoot has occurred, i.e., the replica signal subtracted from the outgoing signal was too great. This is immediately sensed by the error signal control 19 and the gain control networks 22 are readjusted to close the gap. It has been found in practice that convergence toward essentially maximum echo removal can be achieved in a moderate time interval by thus adjusting the gain coefficients for each tap signal of the transversal filter in accordance with the integral of the product of the error signal and the signal appearing at the several taps of the transversal filter delay.

An input signal, $x(t)$, gives rise to an echo signal, $y(t)$, in the outgoing transmission circuit 13. The input, $x(t)$, is also transformed by the echo canceller into a signal $y_a(t)$, which is subtracted from $y(t)$ in the difference network 18. The objective is that the resulting difference, $e(t)$, should eventually become small, i.e., that $$e(t)=y(t)-y_a(t)<\epsilon(t)$$

for (1)

$$t>T_s,$$

where $\epsilon(t)$ depends on the suppression desired. The time required to accomplish this, $T_s$, is called the settling time.

Within the echo canceller $x(t)$ is delayed by multiples of a fixed time, $\tau$, thereby generating a sequence of functions $$\underline{X}=\{x_i(t)=x(t-i\tau);\ i=0, 1, \ldots, N\}.$$

Each of these functions, $x_i$, is multiplied by a factor, $g_i$, and summed to form $y_a(t)$, i.e., $$y_a(t)=g_0x_0+g_1x_1+\ldots+g_Nx_N.$$

The pertinent vector quantities can be defined as follows:

$$\underline{G}\equiv[g_0g_1\ldots g_N] \text{ and}$$

$$\underline{X}\equiv\begin{bmatrix} x_0 \\ x_1 \\ \cdot\cdot \\ \cdot\cdot \\ x_N \end{bmatrix}$$

From the above it will be apparent that $$y_a(t)=\underline{G}\cdot\underline{X}.$$

Now let the impulse response of the echo network be denoted by $h(t)$ and define the vector $$\underline{H}=[h_0h_1\ldots h_N]$$

where $$h_i=\tau h(i\tau);\ i=0, 1, \ldots, N.$$

For the normal case, it is known that $$y(t)=\underline{H}\cdot\underline{X}.$$

For equation (1) to hold for all $x(t)$ it is necessary and sufficient that the distance $\|\underline{H}-\underline{G}\|$, be bounded by a number related to $\epsilon(t)$, i.e., $$\|\underline{H}-\underline{G}\| \quad (2)$$

for $t>T_s$.

Now the control network is such that equation (2) will be met and the settling time, $T_s$, decreased as the "loop gain factor" $K$ increases. It is also intuitively clear that $T_s$ decreases as the initial distance $\|\underline{H}-\underline{G}\|_{t=0}$ decreases. If it is assumed that initially $\underline{G}=\underline{0}$ there would be an average initial distance depending on the ensemble of possible echo paths. For this so-called average or typical echo path, and for typical input functions $x(t)$, there is a characteristic settling time depending only on the adaption control network. This characteristic settling time can be increased by increasing the parameter $K$ in the control network. Unfortunately increasing $K$, to obtain a faster rate of adaptation, leads to the difficulties heretofore noted.

In the foregoing analysis it was assumed that $y(t)$ consisted of only the echo of $x(t)$. In practice there will, of course, also be a noise component. When the subscriber within the echo network is talking his speech is equivalent to noise; thus the noise component can b quite large. The noise will tend to make the echo canceller diverge from equation (2). The rate of divergence also increases as the parameter $K$ increases. In order to prevent excessive divergence $K$ should be small, while to prevent an excessively long characteristic settling time $K$ should be large. Clearly the value of $K$ must be a compromise. Once it is chosen other means must be sought for improving settling time.

It should be apparent at this point that if the initial distance $\|\underline{H}-\underline{G}\|_{t=0}$ could be reduced, the settling time would also be reduced. In fact, if $\underline{H}$ was known exactly a priori one could initially set $\underline{G}=\underline{H}$ and the settling time would be zero. This is not possible, of course, since $\underline{H}$ is different for each and every connection. The components of $\underline{H}$ are, however, proportional to the time samples of the echo path impulse response.

Now a statistical distribution of a plurality of echo path impulse response envelopes can be obtained in accordance with techniques known in the art; the most obvious of the latter being a conventional empirical approach. That is, a large number of connections can be tested and their echo impulse responses measured. As might be expected, these response envelopes are more-or-less similar in shape but vary in magnitude. From a statistical distribution of the echo path impulse response envelopes so obtained, a select statistical parameter (e.g., arithmetic mean or average) can be arrived at. If this average envelope, for example, is then used for the initial setting of $\underline{G}$, a reduction in $\|\underline{H}-\underline{G}\|_{t=0}$ would result, at least for those connections where the actual envelope is larger than the average envelope; that is, for half of the connections. Unfortunately, the proper polarity of each component of $\underline{G}$ cannot be known in advance. However, if the proper polarity could be determined in addition to the magnitude statistically arrived at, then $\|\underline{H}-\underline{G}\|_{t=0}$ could be reduced and the settling time improved. This, in essence, is what is accomplished in accordance with the invention.

Thus, in accordance with the method of the present invention, tap gain magnitudes, related to a predetermined parameter (e.g., arithmetic mean or average) of the statistical distribution of a large number of echo path impulse response envelopes, are first stored, i.e., store $$g_0', g_1', g_2', \ldots, g_N',$$

where $g_i' \geq 0$.

The gains of the taps of the transversal filter and then initially set equal to zero, $$g_i(0)=0; i=0, 1, 2, \ldots, N.$$

The adaptation process is next allowed to proceed for a period of time, $t_p$, sufficient to determine the proper polarity of each tap gain $g_i$ with a good degree of accuracy. The polarities thus determined are assigned to the stored magnitudes ($g_i'$) and the values of the filter tap gains are set to these new values, i.e., $$g_i(t_p^+)=g_i' \operatorname{sgn} [g_i(t_p^-)], i=0, 1, 2, \ldots, N.$$

Thereafter, adaptation is allowed to proceed undisturbed (i.e., naturally from this point of time.

In a typical embodiment of the invention the stored statistical parameter comprises the arithmetic mean or average of echo path impulse response envelopes (i.e., $g_i'=[\overline{rh(i\tau)}]$. However, in particular instances another of the known statistical parameters (e.g., median, weighted average, etc.) of the statistical echo path response envelopes may preferably be so stored.

The value of the time $t_p$ is not critical. It should of course be short enough to speed up the settling time, but long enough so that polarities are correct. For the typical speech signals encountered, a time $t_p$ on the order of 100 milliseconds is satisfactory.

The equipment necessary to implement the method of the invention is shown in heavy outline in the drawing. The tap gain magnitudes ($g_0'$, $g_1'$, $g_2'$..., $g_N'$) are stored in the permanent memory storage device 30. For an analog arrangement the storage device 30 may comprise a simple resistance network having a plurality of taps from which the predetermined magnitudes $g_i'$ are derived. A speech detector 31 is connected to circuit 12 for the purpose of detecting the presence of speech signals in said circuit. When the incoming speech exceeds a predetermined threshold level the detector 31 enables clock 32 and initiates a timing operation therein. At the start of this timing period a clear signal is derived from clock 32 and the same is delivered via lead 42, to integrators 23 to clear or set the tap components of the tap gain vector to zero. If the integrators 23 are of a conventional capacitive storage type, this set or clear operation can be readily accomplished by completing a discharge path across the integrator capacitors to thereby discharge the same to zero. The adaptation process then proceeds normally. The outputs of the integrators 23–0 through 23–N are respectively connected to the sign networks 33–0 through 33–N. The clock 32 is preset to deliver, via lead 44, a time out signal at the end of the determined period $t_p$. The signal on lead 44 is coupled to each sign network 33, which in response thereto serves to assign the instantaneous polarities of the respective integrator outputs to the stored magnitudes $g_i'$ and then set the gain components ($g_0$, $g_1$ ..., $g_N$ ) in accordance with the same. For example, at the end of the time period $t_p$ the signal on lead 44 closes a switch in sign network 33–0. This switch thus couples the present output of integrator 23–0 to a multiplier circuit, in sign network 33–0, via an infinite clipper. The other input to the latter multiplier circuit is the value $g_0'$ stored in memory 30. The multiplier thus assigns the polarity of the integrator 23–0 output to the stored value $g_0'$. The integrator 23–0 is then set in accordance with this multiplier output.

It will be apparent to those in the art that the above-recited implementation is only by way of example and there are numerous other, rather obvious circuit arrangements wherein the desired functions may be carried out. Moreover, as is known, various digital implementations of the basic adaptive echo canceller have been proposed. And, it should be obvious, that the method of the invention could be readily implemented in digital form. Accordingly, it must be stressed that the present invention in no way necessitates any specific apparatus and numerous circuits can be devised by those skilled in the art for accomplishing the same.

As has been noted in the aforementioned Sondhi article, a tapped delay line type transversal filter is not essential to an adaptive echo canceller system. That is, Laguerre networks, for example, can be substituted for the delay networks 21–0 through 21–N to achieve satisfactory simulation of the echo path. This is discussed in greater detail in the copending application of M. M. Sondhi, Ser. No. 590,583, filed Oct. 31, 1966, now Pat. No. 3,499,999. In fact, as should be apparent to those in the art, the delay units or networks of delay line 21 can be replaced by any other known networks which form a complete basis set–e.g., such as an exponential series.

As understood by those skilled in the art, a complete basis set comprises a system of functions $\{\phi_K(t)\}$ such that all members of the space can be represented by a weighted linear combination of the members of $\{\phi_k(t)\}$, see the textbook *Theory of Functions of a Real Variable* by I. P. Natanson, Frederick Ungar Publishing Company (1955), page 181. Complete basis sets have been extensively treated in the mathematical and technical literature; see, by way of further example, *Mathematics of Physics and Modern Engineering* by Sokolnikoff et al., McGraw-Hill Book Company, Inc., (1958), page 203. Such modifications of the basic echo canceller, moreover, have no affect on the principles of the present invention and the same may be utilized by any adaptive echo canceller regardless of the configuration of the complete basis set utilized therein.

What is claimed is:

1. A method for improving the settling time of an adaptive echo canceller having a tap gain vector of $N$ tap components comprising the steps of storing $N$ tap gain magnitudes related to a statistically determined average echo path impulse response envelope, initially setting the gains of said tap components equal to zero, determining the polarity of each tap component after a predetermined period of natural convergence, assigning the determined polarities to the stored tap gain magnitudes and setting the gains of said tap components to these new values, and allowing adaptation to thence proceed undistributed.

2. A method for decreasing the settling time of an adaptive echo canceller having a plurality of filter networks that comprise a complete basis set and a tap gain vector of $N$ tap gain components comprising the steps of storing $N$ sample tap gain magnitudes that are related to a predetermined parameter of the statistical distribution of a plurality of echo path impulse response envelopes, initially setting the gains of said tap components equal to zero in response to a speech signal input to the echo canceller, determining the polarity of each tap component after a predetermined period of adaptation, assigning the determined polarities to said stored $N$ samples of tap gain magnitudes, setting the respective gains of said tap gain components in accordance with said assigned gain magnitudes, and converging thence toward maximum echo cancellation.

3. The method for decreasing settling time as defined in claim 2 wherein said predetermined parameter comprises the arithmetic mean of said echo path impulse response envelopes.

4. The method for decreasing settling time as defined in claim 3 wherein convergence proceeds naturally after the setting of the gains of said tap gain components.

5. The method for decreasing settling time as defined in claim 4 wherein said polarity is determined after a period of natural adaptation on the order of 100 milliseconds.

6. In an adaptive echo canceller which includes a plurality of distinct networks that comprise a complete basis set, a plurality of $N$ network taps, and means for individually adjusting the gains of signals derived from said taps so that a tap gain vector of $N$ tap components is derived which provides maximum echo cancellation, said adaptive echo canceller being characterized by means for storing $N$ sample tap gain magnitudes which are related to a predetermined parameter of the statistical distribution of a plurality of echo path impulse response envelopes, means for initially setting said tap gain adjusting means to zero gain in response to a speech signal input to the echo canceller, means for determining the polarity of each of the signals derived from said taps after a predetermined period of time, means for assigning the determined polarities to said stored $N$ samples of tap gain magnitudes, and means for setting the respective gains of said tap gain adjusting means to the assigned tap gain magnitudes, convergence thence proceeding undisturbed from the latter settings of the tap gain adjusting means.

7. In an adaptive echo canceller as defined in claim 6 wherein the plurality of distinct networks comprise series-connected delay units to thus define a transversal filter type echo canceller, said predetermined parameter of the statistical distribution comprising the average of the echo path impulse response envelopes.

* * * * *